US012567381B2

(12) United States Patent
Pyun et al.

(10) Patent No.: US 12,567,381 B2
(45) Date of Patent: Mar. 3, 2026

(54) DRIVING CONTROLLER AND ELECTRONIC DEVICE INCLUDING THE SAME

(71) Applicant: Samsung Display Co., Ltd., Yongin-Si (KR)

(72) Inventors: Kihyun Pyun, Yongin-si (KR); Jungeon An, Yongin-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 0 days.

(21) Appl. No.: 19/066,171

(22) Filed: Feb. 28, 2025

(65) Prior Publication Data

US 2025/0356810 A1 Nov. 20, 2025

(30) Foreign Application Priority Data

May 17, 2024 (KR) ........................ 10-2024-0064613

(51) Int. Cl.
*G09G 3/3275* (2016.01)
*G09G 3/32* (2016.01)

(52) U.S. Cl.
CPC ............ *G09G 3/3275* (2013.01); *G09G 3/32* (2013.01); *G09G 2300/0842* (2013.01); *G09G 2310/0275* (2013.01); *G09G 2320/0204* (2013.01); *G09G 2320/0233* (2013.01); *G09G 2320/0238* (2013.01)

(58) Field of Classification Search
CPC .................. G09G 3/3275; G09G 3/32; G09G 2300/0842; G09G 2310/0275; G09G 2320/0204; G09G 2320/0233; G09G 2320/0238
See application file for complete search history.

(56) References Cited

U.S. PATENT DOCUMENTS

| | | | | |
|---|---|---|---|---|
| 7,839,375 | B2 * | 11/2010 | Lee | G09G 3/3648 345/98 |
| 10,565,927 | B2 * | 2/2020 | Suk | G09G 3/3233 |
| 10,762,858 | B2 | 9/2020 | Kim et al. | |
| 11,749,164 | B2 * | 9/2023 | Pyun | G09G 3/2007 345/100 |
| 2018/0261184 | A1 * | 9/2018 | Ninan | G09G 5/005 |
| 2020/0160801 | A1 * | 5/2020 | Wang | H04N 1/4078 |
| 2020/0211457 | A1 * | 7/2020 | Kim | G09G 3/3233 |
| 2022/0036833 | A1 * | 2/2022 | Park | G09G 3/3233 |
| 2022/0122234 | A1 * | 4/2022 | Yim | G09G 5/02 |

FOREIGN PATENT DOCUMENTS

| | | | |
|---|---|---|---|
| KR | 10-1160832 | B1 | 6/2012 |
| KR | 10-2018-0056458 | A | 5/2018 |
| KR | 10-2023-0019311 | A | 2/2023 |

* cited by examiner

*Primary Examiner* — Andrew Sasinowski
(74) *Attorney, Agent, or Firm* — Innovation Counsel LLP

(57) ABSTRACT

Disclosed is a driving controller of an electronic device including a memory that stores the input image signal and outputs a previous image signal, a counter circuit that counts up a count value when the previous image signal corresponds to a black grayscale, and outputs a count value, a gain calculator that outputs a gain in response to the count value, and a compensation unit that outputs an image data signal based on the input image signal and the gain when the previous image signal corresponds to the black grayscale.

20 Claims, 16 Drawing Sheets

| RGB | DCC_DS |
|---|---|
| 0G | 0G |
| 32G | 30G |
| 64G | 61G |
| 96G | 91G |
| 128G | 121G |
| 160G | 152G |
| 192G | 182G |
| 224G | 212G |
| 256G | 243G |

DRIVING CONTROLLER AND ELECTRONIC DEVICE INCLUDING THE SAME

CROSS-REFERENCE TO RELATED APPLICATIONS

This application claims priority under 35 U.S.C. § 119 to Korean Patent Application No. 10-2024-0064613 filed on May 17, 2024, in the Korean Intellectual Property Office, the disclosures of which are incorporated by reference herein in their entireties.

BACKGROUND

Embodiments of the present disclosure described herein relate to a driving controller and an electronic device including the same.

Electronic devices, which provide images to users, such as a smart phone, a digital camera, a notebook computer, a navigation system, a monitor, and a smart television include an electronic device for displaying the images. The electronic device generates an image and provides the users with the generated image through a display screen.

The electronic device includes a display panel and a driving controller for controlling the display panel. The driving controller may provide a data signal to the display panel. As a current corresponding to the data signal may be provided to pixels of the display panel, a predetermined image may be displayed.

An image displayed in a display frame may be perceived differently from the desired luminance depending on the grayscale of the image displayed in the previous frame.

SUMMARY

Embodiments of the present disclosure provide a driving controller capable of improving display quality and an electronic device including the same.

According to an embodiment, a driving controller includes a memory that stores an input image signal and outputs a previous image signal, a counter circuit that counts up a count value when the previous image signal corresponds to a black grayscale, and outputs a count value, a gain calculator that outputs a gain in response to the count value, and a compensation unit that outputs an image data signal based on the input image signal and the gain when the previous image signal corresponds to the black grayscale.

In an embodiment, the input image signal may be an image signal corresponding to a current frame, and the previous image signal may be an image signal corresponding to a previous frame.

In an embodiment, the counter circuit may output a number of consecutive frames, in which the previous image signal corresponds to the black grayscale, as the count value.

In an embodiment, the gain calculator may output the gain having a value inversely proportional to the count value.

In an embodiment, the gain calculator may output the gain having a value inversely proportional to the count value when the count value is less than or equal to a reference value and may output the gain having a predetermined value when the count value is greater than the reference value.

In an embodiment, the compensation unit may operate in one of a dynamic capacitance compensation DCC compensation on mode or a DCC compensation off mode. In the DCC compensation on mode, the compensation unit may output a DCC compensation signal corresponding to the input image signal.

In an embodiment, when the previous image signal corresponds to the black grayscale in the DCC compensation on mode, the compensation unit may output a product of the DCC compensation signal and the gain as the image data signal.

In an embodiment, the gain may be less than or equal to 1.

In an embodiment, in the DCC compensation on mode, the compensation unit may output the DCC compensation signal corresponding to a grayscale lower than a grayscale of the input image signal.

In an embodiment, in the DCC compensation off mode, the compensation unit may output the DCC compensation signal identical to the input image signal.

According to an embodiment, an electronic device includes a display panel, a driving controller that receives an input image signal and outputs an image data signal, and a data driving circuit that provides the display panel with a data signal corresponding to the image data signal. The driving controller includes a memory that stores the input image signal and outputs a previous image signal, a counter circuit that counts up a count value when the previous image signal corresponds to a black grayscale, and outputs a count value, a gain calculator that outputs a gain in response to the count value, and a compensation unit that outputs the image data signal based on the input image signal and the gain when the previous image signal corresponds to the black grayscale.

In an embodiment, the input image signal may be an image signal corresponding to a current frame and the previous image signal may be an image signal corresponding to a previous frame.

In an embodiment, the counter circuit may output a number of consecutive frames, in which the previous image signal corresponds to the black grayscale, as the count value.

In an embodiment, the gain calculator may output the gain having a value inversely proportional to the count value.

In an embodiment, the gain calculator may output the gain having a value inversely proportional to the count value when the count value is less than or equal to a reference value and may output the gain having a predetermined value when the count value is greater than the reference value.

In an embodiment, the compensation unit may operate in one of a DCC compensation on mode or a DCC compensation off mode. In the DCC compensation on mode, the compensation unit may output a DCC compensation signal corresponding to the input image signal.

In an embodiment, when the previous image signal corresponds to the black grayscale in the DCC compensation on mode, the compensation unit may output a product of the DCC compensation signal and the gain as the image data signal.

In an embodiment, the gain may be less than or equal to 1.

In an embodiment, in the DCC compensation on mode, the compensation unit may output the DCC compensation signal corresponding to a grayscale lower than a grayscale of the input image signal.

In an embodiment, in the DCC compensation off mode, the compensation unit may output the DCC compensation signal identical to the input image signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
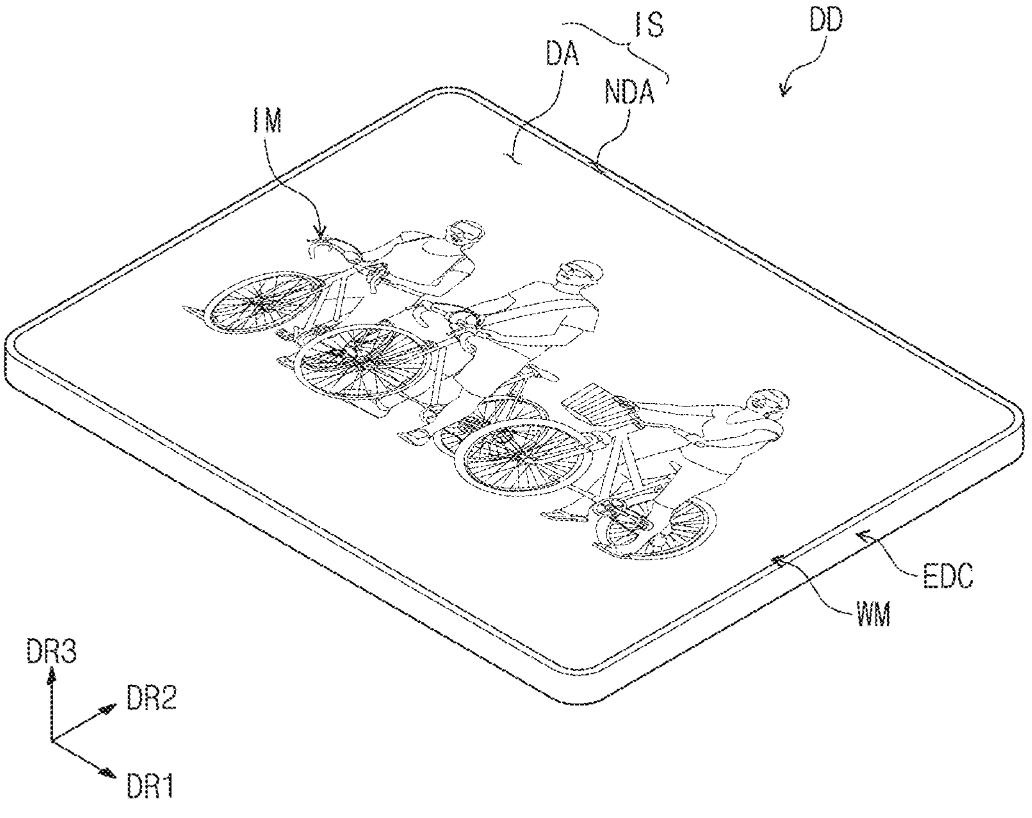
FIG. 1 is a perspective view of an electronic device according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

The same sign refers to the same element. Also, in drawings, the thickness, ratio, and dimension of components are exaggerated for effectiveness of description of technical contents. The term "and/or" includes one or more combinations of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of an electronic device DD according to an embodiment of the present disclosure.

Figure 2:
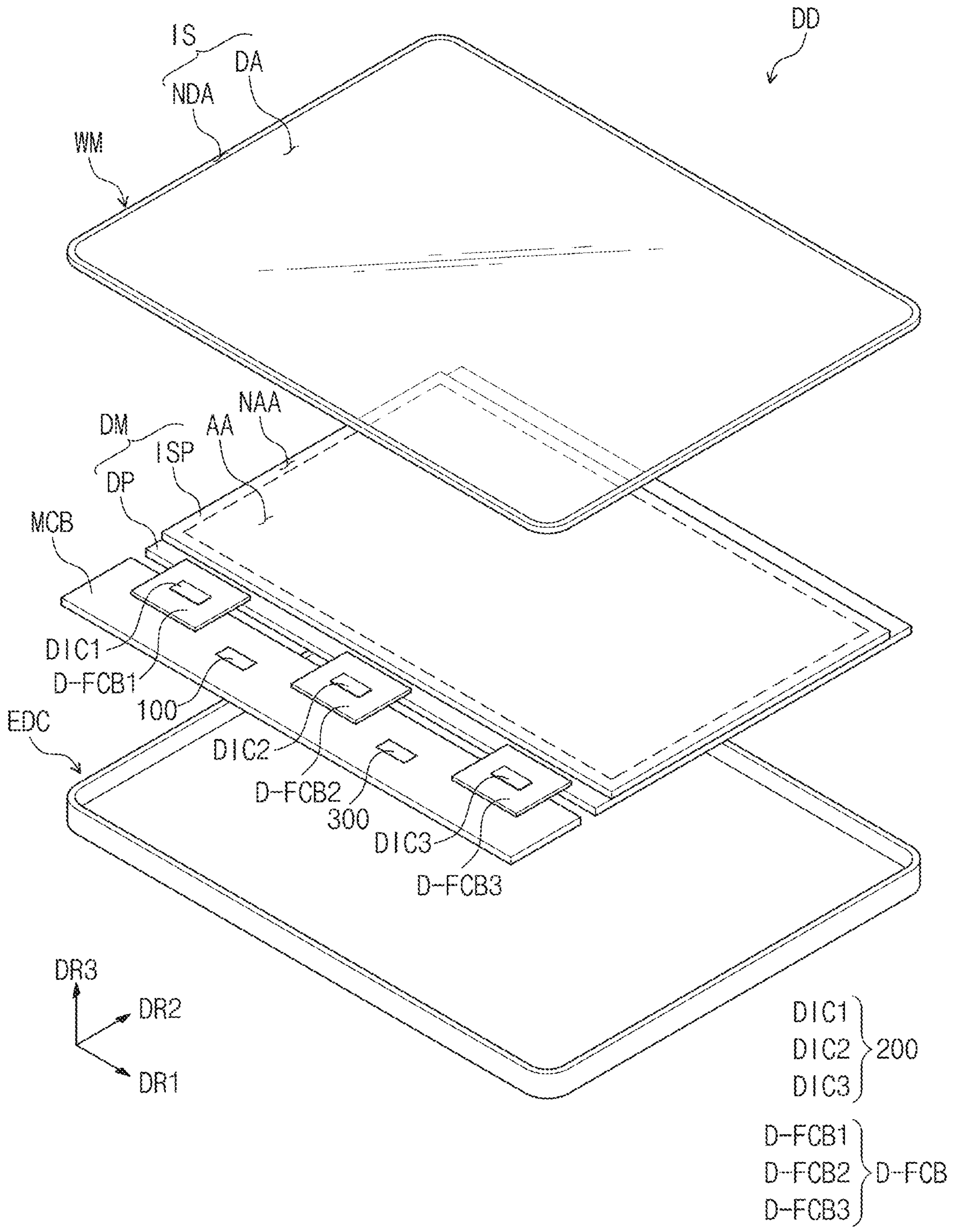
FIG. 2 is an exploded perspective view of an electronic device according to an embodiment of the present disclosure.

FIG. 2 is an exploded perspective view of the electronic device DD according to an embodiment of the present disclosure.

Referring to FIGS. 1 and 2, an electronic device DD may be a device activated in response to an electrical signal. The electronic device DD according to an embodiment of the present disclosure may be a small and medium-sized electronic device, such as a mobile phone, a tablet PC, a notebook computer, a vehicle navigation system, or a game console, as well as a large-sized electronic device, such as a television or a monitor. The above examples are provided only as examples, and it is obvious that the electronic device DD may be applied to any other display device(s) without departing from the concept of the present disclosure. The electronic device DD is in a shape of a rectangle having a long side in a first direction DR1 and a short side in a second direction DR2 intersecting the first direction DR1. However, the shape of the electronic device DD is not limited thereto. For example, the electronic device DD may be implemented in various shapes. The electronic device DD may display an image IM on a display surface IS parallel to each of the first direction DR1 and the second direction DR2, so as to face a third direction DR3. The display surface IS on which the image IM is displayed may correspond to a front surface of the electronic device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A distance between the front surface and the rear surface in the third direction DR3 may correspond to a thickness of the electronic device DD in the third direction DR3. Meanwhile, directions that the first, second, and third directions DR1, DR2, and DR3 indicate may be relative in concept and may be changed to different directions.

The electronic device DD may sense an external input applied from the outside. The external input may include various types of inputs that are provided from the outside of the electronic device DD. The electronic device DD according to an embodiment of the present disclosure may sense an external input of a user which is applied from the outside. The external input of the user may be one of various types of external inputs such as a part of his/her body, light, heat, his/her gaze, and pressure, or a combination thereof. Also, the electronic device DD may sense the external input of the user applied to a side surface or a rear surface of the electronic device DD depending on a structure of the electronic device DD and is not limited to an embodiment. As an example of the present disclosure, an external input may include an input entered through an input device (e.g., a stylus pen, an active pen, a touch pen, an electronic pen, or an E-pen).

The display surface IS of the electronic device DD may include a display area DA and a non-display area NDA. The display area DA may be an area in which the image IM is displayed. A user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is disposed adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be positioned to be adjacent to only one side of the display area DA or may be omitted. The electronic device DD according to an embodiment of the present disclosure may include various embodiments and is not limited to an embodiment.

As illustrated in FIG. 2, the electronic device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, or the like. Hereinafter, in an embodiment, the description will be given under the condition that the display panel DP is an organic light emitting display panel.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be attached to an upper surface of the display panel DP by the inner adhesive film.

The window WM may be formed of a transparent material capable of transmitting the image IM. For example, the window WM may be formed of glass, sapphire, plastic, etc. It is illustrated that the window WM is implemented with a single layer. However, an embodiment is not limited thereto. For example, the window WM may include a plurality of layers.

Meanwhile, although not illustrated, the non-display area NDA of the electronic device DD described above may correspond to an area that is defined by printing a material including a given color on one area of the window WM. As an example of the present disclosure, the window WM may include a light blocking pattern for defining the non-display area NDA. The light blocking pattern that is a colored organic film may be formed, for example, in a coating manner.

The window WM may be coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer may be further disposed between the window WM and the display module DM. The anti-reflection layer decreases the reflectivity of external light incident from above the window WM. The anti-reflection layer according to an embodiment of the present disclosure may include a phase retarder and a polarizer. The phase retarder may have a film type or a liquid crystal coating type. The polarizer may also be a polarizer of a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. Also, the anti-reflection layer may further include a light blocking pattern.

The display module DM may display the image IM in response to an electrical signal and may transmit/receive information about an external input. The display module DM may include an active area AA and an inactive area NAA. The active area AA may be defined as an area through which the image IM provided from the display area DA is output. Also, the active area AA may be defined as an area in which the input sensing layer ISP senses an external input applied from the outside.

The inactive area NAA is disposed adjacent to the active area AA. For example, the inactive area NAA may surround the active area AA. However, this is illustrated by way of example. The inactive area NAA may be defined in various shapes, not limited to an embodiment. According to an embodiment, the active area AA of the display module DM may correspond to at least part of the display area DA.

The electronic device DD may further include a main circuit board MCB, flexible circuit films D-FCB, a driving controller 100, a data driving circuit 200, and a voltage generator 300. The main circuit board MCB may be connected to the display panel DP via the flexible circuit films D-FCB. The flexible circuit films D-FCB are connected to the display panel DP so as to electrically connect the display panel DP to the main circuit board MCB. The main circuit board MCB may include a plurality of driving elements. The plurality of driving elements may include a circuit unit for driving the display panel DP. The data driving circuit 200 may be mounted on the flexible circuit films D-FCB.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced apart from one another in the first direction DR1 and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, an embodiment of the present disclosure is not limited thereto. For example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

The input sensing layer ISP may be electrically connected with the main circuit board MCB through the flexible circuit films D-FCB. However, an embodiment of the present disclosure is not limited thereto. That is, the display module DM may additionally include a separate flexible circuit film for electrically connecting the input sensing layer ISP and the main circuit board MCB.

In an embodiment, the driving controller 100 and the voltage generator 300 may be disposed on the main circuit board MCB. The driving controller 100 and the voltage generator 300 may be electrically connected to the display panel DP through the main circuit board MCB and the flexible circuit films D-FCB.

The electronic device DD further includes an external case EDC for accommodating the display module DM. The outer case EDC may be coupled with the window WM to define the exterior of the electronic device DD. The outer case EDC may absorb external shocks and may prevent a foreign material/moisture or the like from being infiltrated into the display module DM such that components accommodated in the outer case EDC are protected. Meanwhile, as an example of the present disclosure, the outer case EDC may be provided in the form of a combination of a plurality of accommodating members.

Figure 3:
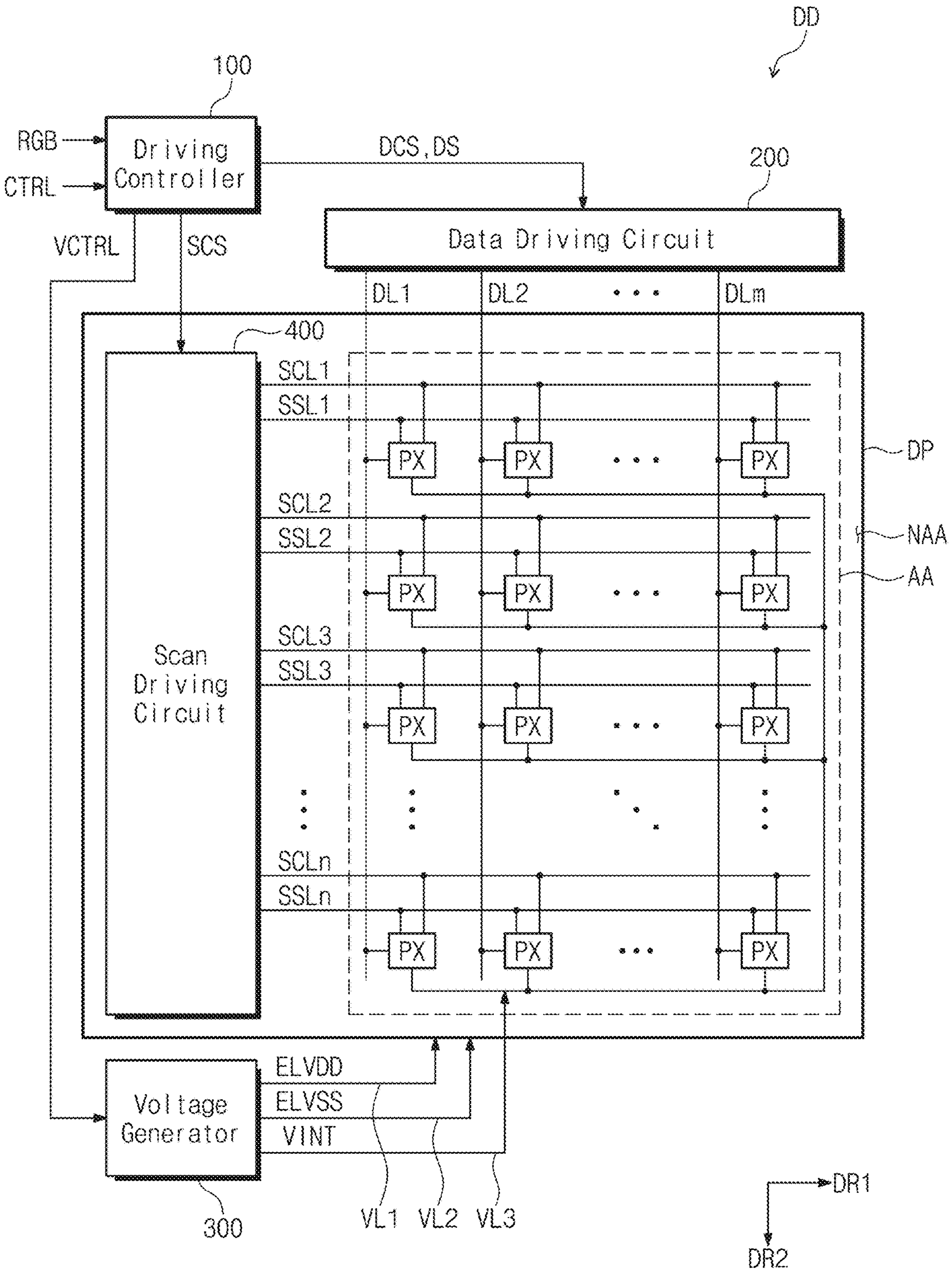
FIG. 3 is a block diagram of an electronic device according to an embodiment of the present disclosure.

FIG. 3 is a block diagram of an electronic device according to an embodiment of the present disclosure.

Referring to FIG. 3, the electronic device DD includes a driving controller 100, a data driving circuit 200, a voltage generator 300, a scan driving circuit 400, and a display panel DP. The driving controller 100, the data driving circuit 200, and the scan driving circuit 400 may be referred to as a "driving circuit" for providing a data signal to pixels PX of the display panel DP.

The driving controller 100 receives an input image signal RGB and a control signal CTRL. The driving controller 100 converts the input image signal RGB into an image data signal DS and outputs the image data signal DS. The driving controller 100 outputs a scan control signal SCS and a data control signal DCS. In an embodiment, the driving controller 100 may output a voltage control signal VCTRL for controlling the voltage generator 300.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later. The data signals refer to analog voltages corresponding to grayscale values of the image data signal DS.

The display panel DP includes first scan lines SCL1 to SCLn, second scan lines SSL1 to SSLn, the data lines DL1 to DLm, and pixels PX.

The display panel DP may include the active area AA and the inactive area NAA. The pixels PX may be positioned in the active area AA. The scan driving circuit 400 may be positioned in the inactive area NAA.

The first scan lines SCL1 to SCLn and the second scan lines SSL1 to SSLn are positioned spaced apart from each other in the second direction DR2. The data lines DL1 to DLm extend from the data driving circuit 200 in a direction opposite to the second direction DR2 and are arranged spaced apart from one another in the first direction DR1.

The plurality of pixels PX are electrically connected to the first scan lines SCL1 to SCLn, the second scan lines SSL1 to SSLn, and the data lines DL1 to DLm. For example, the first row of pixels may be connected to the first and second scan lines SCL1 and SSL1. Moreover, the second row of pixels may be connected to the first and second scan lines SCL2 and SSL2.

Each of the plurality of pixels PX includes a light emitting element ED (see FIG. 4) and a pixel circuit PXC (see FIG. 4) for controlling the light emission of the light emitting element ED. The pixel circuit PXC may include a plurality of transistors and a capacitor. The scan driving circuit 400 may include transistors formed through the same process as the pixel circuit PXC. In an embodiment, the light emitting element ED may be an organic light emitting diode. However, the present disclosure is not limited thereto.

Each of the plurality of pixels PX receives a first driving voltage ELVDD, a second driving voltage ELVSS, and an initialization voltage VINT.

The scan driving circuit 400 receives the scan control signal SCS from the driving controller 100. In response to the scan control signal SCS, the scan driving circuit 400 may output first scan signals to the first scan lines SCL1 to SCLn and may output second scan signals to the second scan lines SSL1 to SSLn.

In an embodiment, the scan driving circuit 400 may be placed in the inactive area NAA disposed adjacent to the first side of the active area AA. The first scan lines SCL1 to SCLn and the second scan lines SSL1 to SSLn extend in the first direction DR1 from the scan driving circuit 400.

In an embodiment, the scan driving circuit 400 may be disposed on each of a first side and a second side of the active area AA. For example, the scan driving circuit disposed on the first side of the active area AA may provide the first scan signals to the first scan lines SCL1 to SCLn. The scan driving circuit disposed on the second side of the active area AA may provide the second scan signals to the second scan lines SSL1 to SSLn.

The voltage generator 300 generates voltages necessary to operate the display panel DP. In an embodiment, the voltage generator 300 generates a first driving voltage ELVDD, a second driving voltage ELVSS, and an initialization voltage VINT which are necessary for an operation of the display panel DP. The first driving voltage ELVDD, the second driving voltage ELVSS and the initialization voltage VINT may be provided to the display panel DP through a first voltage line VL1, a second voltage line VL2, and a third voltage line VL3.

In addition to the first driving voltage ELVDD, the second driving voltage ELVSS, and the initialization voltage VINT, the voltage generator 300 may further generate various voltages necessary for operations of the display panel DP, the driving controller 100, the data driving circuit 200, and the scan driving circuit 400.

In an embodiment, when the input image signal RGB input to the previous frame corresponds to a black grayscale, the driving controller 100 may output the image data signal DS based on the input image signal RGB of the current frame and a gain according to the number of frames in which a black grayscale is continuously input. The configuration and operation of the driving controller 100 will be described in detail later.

Figure 4:
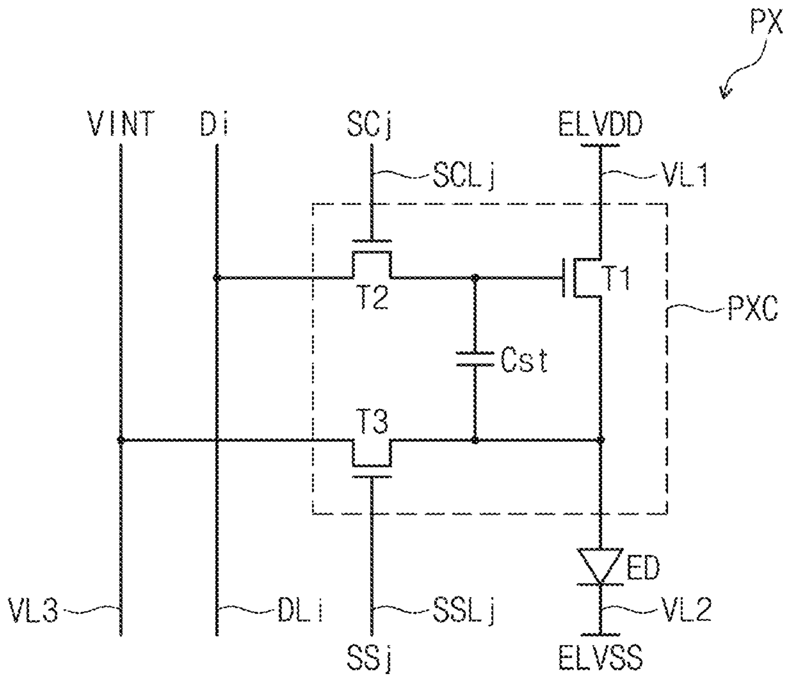
FIG. 4 is an equivalent circuit diagram of a pixel according to an embodiment of the present disclosure.

FIG. 4 is an equivalent circuit diagram of a pixel according to an embodiment of the present disclosure.

FIG. 4 illustrates a circuit diagram of a pixel PX connected to an i-th data line DLi among the data lines DL1 to DLm, a j-th first scan line SCLj among the first scan lines SCL1 to SCLn, and a j-th second scan line SSLj among the second scan lines SSL1 to SSLn which are illustrated in FIG. 1.

Each of the plurality of pixels PX shown in FIG. 3 may have the same circuit configuration as the pixel PX shown in FIG. 4. In an embodiment, the pixel PX includes the at least one light emitting element ED and the pixel circuit PXC.

The pixel circuit PXC may include at least one transistor which is electrically connected to the light emitting element ED and which is used to provide a current corresponding to the data signal Di delivered from the data line DLi to the light emitting element ED. In an embodiment, the pixel circuit PXC of the pixel PX includes a first transistor T1, a second transistor T2, a third transistor T3, and a capacitor Cst. Each of the first to third transistors T1 to T3 is an N-type transistor which include an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. In an embodiment, at least one of the first to third transistors T1 to T3 may be an N-type transistor and the others thereof may be P-type transistors. Moreover, the circuit configuration of a pixel according to an embodiment of the present disclosure is not limited to an embodiment of FIG. 4. The pixel circuit PXC illustrated in FIG. 3 is only an example. For example, the circuit configuration of the pixel circuit PXC may be modified and implemented.

Referring to FIG. 3, the first scan line SCLj may deliver the first scan signal SCj. The second scan line SSLj may deliver the second scan signal SSj. The data line DLi delivers a data signal Di. The data signal Di may have a voltage level corresponding to the input image signal RGB that is input to the electronic device DD (see FIG. 1).

The first driving voltage ELVDD and the initialization voltage VINT may be delivered to the pixel circuit PXC through the first voltage line VL1 and the third voltage line VL3, respectively. The second driving voltage ELVSS may be delivered to a cathode (or a second terminal) of the light emitting element ED through the second voltage line VL2.

The first transistor T1 includes a first electrode connected to the first voltage line VL1, a second electrode electrically connected to an anode (or a first terminal) of the light emitting element ED, and a gate electrode connected to one end of the capacitor Cst. The first transistor T1 may supply a driving current to the light emitting element ED in response to the data signal Di delivered through the data line DLi depending on a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on in response to the first scan signal SCj received through the first scan line SCLj so as to deliver the data signal Di delivered through the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The third transistor T3 may be turned on in response to the second scan signal SSj received through the second scan line SSLj so as to deliver the initialization voltage VINT to the anode of the light emitting element ED.

As described above, one end of the capacitor Cst is connected to the gate electrode of the first transistor T1, and the other end of the capacitor Cst is connected to the second electrode of the first transistor T1. The structure of the pixel PX according to an embodiment is not limited to the structure illustrated in FIG. 4. The number of transistors included in the pixel PX, the number of capacitors included in the pixel PX, and the connection relationship may be modified in various manners.

Figure 5A:
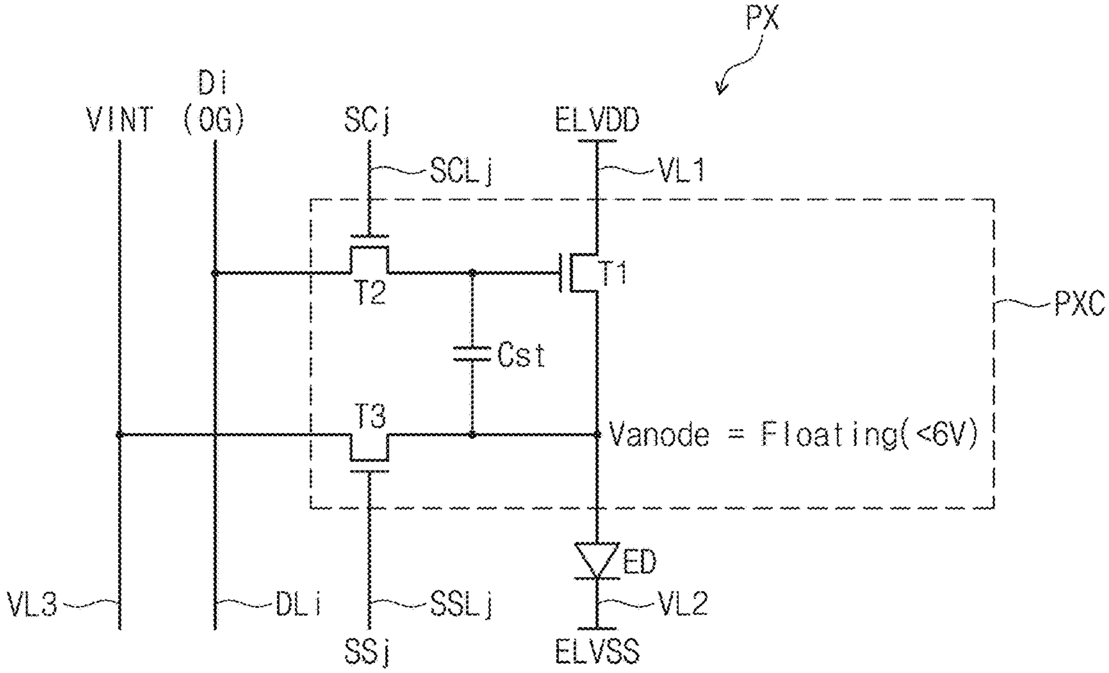
FIGS. 5A and 5B are circuit diagrams for describing an operation of a pixel.
Figure 5B:
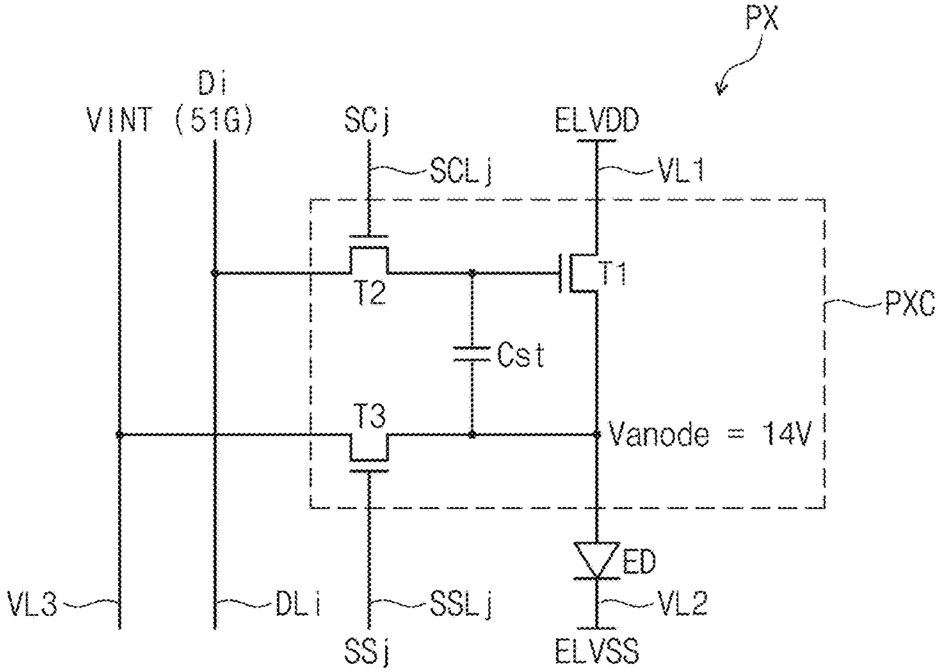

FIGS. 5A and 5B are circuit diagrams for describing an operation of the pixel PX.

FIG. 5A shows the operation of the pixel PX when the data signal Di corresponds to 0 grayscale 0G.

Referring to FIG. 5A, when the data signal Di corresponds to 0 grayscale OG (i.e., a black grayscale), the first transistor T1 is not turned on.

In this case, because no current flows through the light emitting element ED, the voltage of the second electrode of the first transistor T1 (i.e., an anode voltage Vanode of the light emitting element ED) is in a floating state. For example, the anode voltage Vanode of the light emitting element ED may be less than or equal to a threshold voltage of the light emitting element ED, for example, 6 V or less.

FIG. 5B shows the operation of the pixel PX when the data signal Di corresponds to 51 grayscale 51G.

Referring to FIG. 5B, when the data signal Di corresponds to 51 grayscale 51G (i.e., a gray grayscale), the first transistor T1 is turned on.

In this case, when a current flows through the light emitting element ED, the voltage of the second electrode of the first transistor T1 (i.e., the anode voltage Vanode of the light emitting element ED) increases. For example, when the light emitting element ED emits light, the anode voltage Vanode of the light emitting element ED may be 14 V.

Figure 6A:
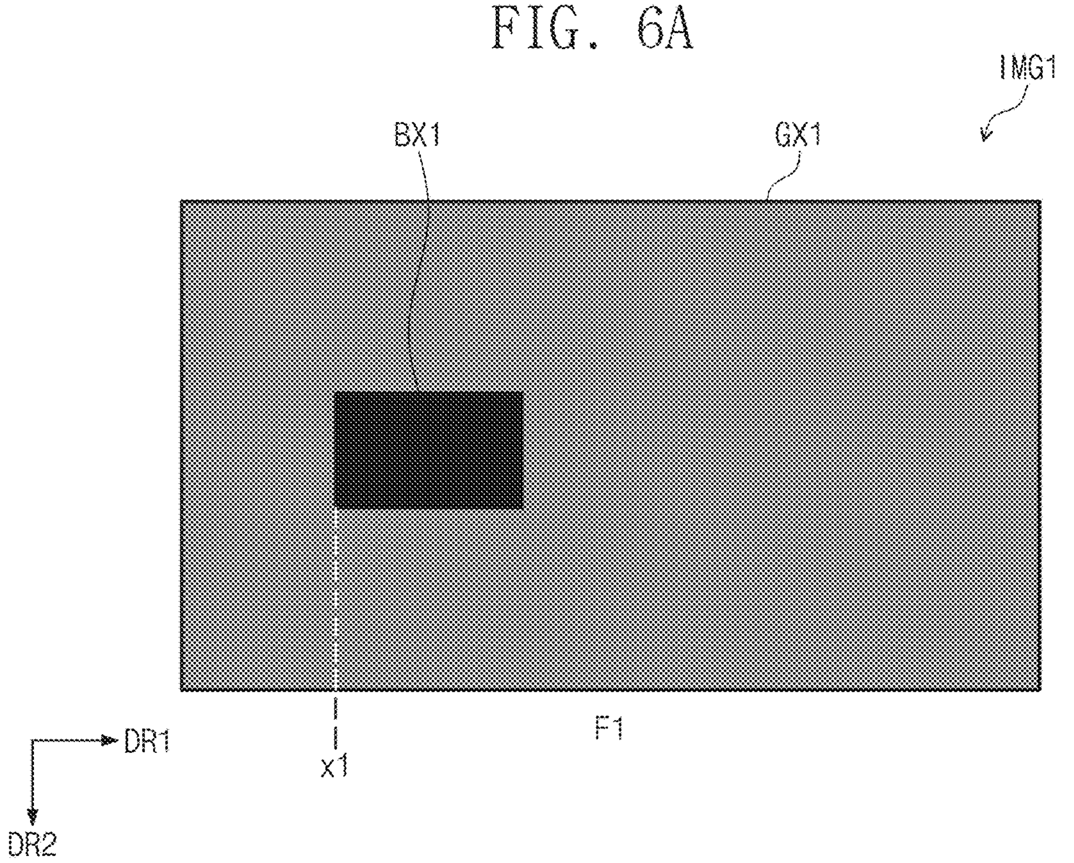
FIGS. 6A and 6B are diagrams showing a first image and a second image displayed on a display panel.
Figure 6B:
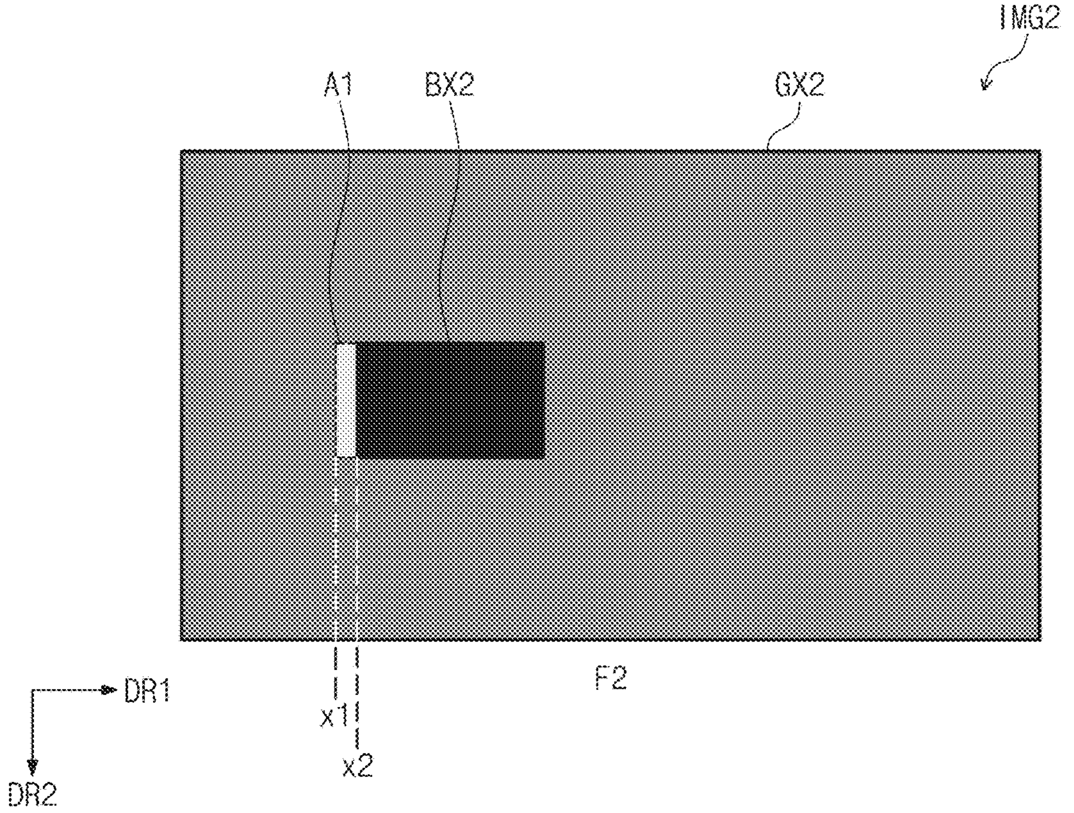

FIGS. 6A and 6B are diagrams showing a first image IMG1 and a second image IMG2 displayed on a display panel.

Referring to FIG. 6A, in a first frame F1, a first image IMG1 includes a black pattern BX1 disposed in an area starting from a first location x1 in a first direction DR1 and a gray pattern GX1 surrounding the black pattern BX1.

Referring to FIGS. 5A and 6A, the anode voltage Vanode of the light emitting element ED in the pixel PX where the black pattern BX1 is displayed may be 6 V or less. The anode voltage Vanode of the light emitting element ED in the pixel PX where the gray pattern GX1 is displayed may be 14 V.

Referring to FIG. 6B, in a second frame F2 following the first frame F1, a second image IMG2 includes a black pattern BX2 disposed in an area starting from a second location x2 in the first direction DR1 and a gray pattern GX2 surrounding the black pattern BX2. That is, the black pattern BX1 of the first frame F1 moves in the first direction DR1, and the gray pattern GX2 is displayed in a first area A1. An anode voltage Vanode of the light emitting element ED in the pixel PX where the gray pattern GX2 is displayed may be 2 V.

Referring to FIGS. 5A, 5B, and 6B, the anode voltage Vanode of the light emitting element ED in the pixel PX located in the first area A1 needs to be changed from 6 V to a voltage corresponding to a gray grayscale of the gray pattern GX2 (e.g., 2 V). In other words, a change amount of the anode voltage Vanode of the light emitting element ED is −4 V.

In areas other than the first area A1 and the black pattern BX2, the anode voltage Vanode of the light emitting element ED in the pixel PX needs to be changed from 14 V to 2 V corresponding to a gray grayscale. In other words, the change amount of the anode voltage Vanode of the light emitting element ED is −12 V.

The time required for the pixels PX located in the first area A1 to reach 2 V is faster than the time required for the pixels PX displaying the gray pattern GX2 other than the first area A1 to reach 2 V. Accordingly, the luminance of the pixels PX located in the first area A1 is temporarily higher than other pixels PX displaying the gray pattern GX2 in the second frame F2.

Figure 7:
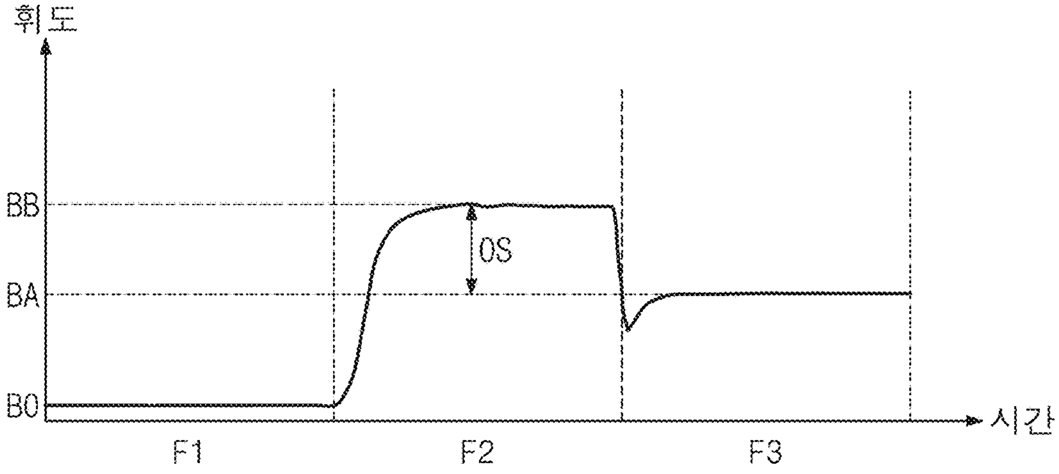
FIG. 7 is a diagram showing a luminance change in a first area of FIG. 6B.

FIG. 7 is a diagram showing a luminance change in the first area A1 of FIG. 6B.

Referring to FIGS. 5A, 5B, 6A, 6B, and 7, the luminance of the first area A1 in the first frame F1 corresponds to a black grayscale BO. In the second frame F2, the luminance of the first area A1 may overshoot by OS to BB which is higher than a desired luminance BA. In a third frame F3, the luminance of the first area A1 may return to the desired luminance BA.

When the black pattern moves in the first direction DR1 during consecutive frames, afterimage may be noticeable to a user.

Figure 8:
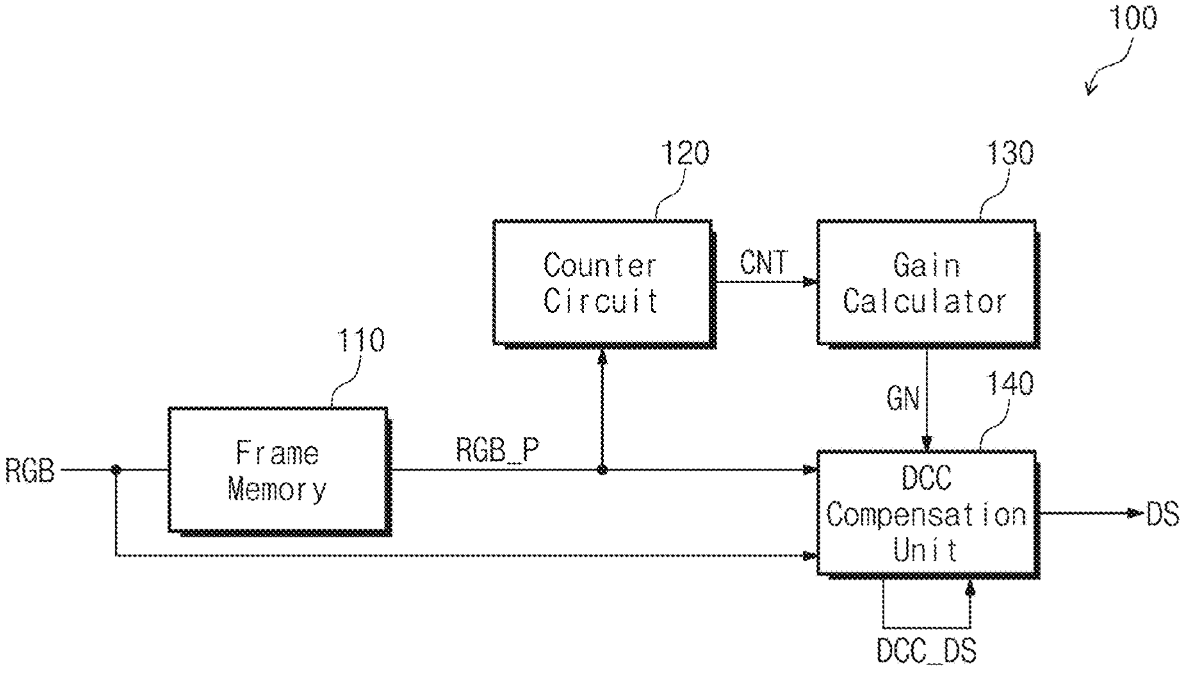
FIG. 8 is a block diagram illustrating a configuration of a driving controller.

FIG. 8 is a block diagram showing a configuration of the driving controller 100. FIG. 8 shows only the configurations related to a function of compensating for luminance change due to a black image among functions of the driving controller 100. The driving controller 100 may further include configurations related to various functions (e.g., configurations related to a function of outputting the scan control signal SCS and the data control signal DCS in response to the control signal CTRL) in addition to the configuration shown in FIG. 8.

Referring to FIG. 8, the driving controller 100 includes a frame memory 110, a counter circuit 120, a gain calculator 130, and a dynamic capacitance compensation (DCC) unit 140.

The frame memory 110 stores the input image signal RGB. In an embodiment, the frame memory 110 stores the input image signal RGB in units of one frame. In other words, the size of the frame memory 110 may be greater than or equal to the size of one frame of the input image signal RGB. The frame memory 110 outputs a previous image signal RGB_P.

The input image signal RGB provided from the outside to the frame memory 110 of the driving controller 100 corresponds to a current frame image signal (e.g., an N-th frame image signal). The previous image signal RGB_P output from the frame memory 110 corresponds to a previous frame image signal (e.g., a (N−1)-th frame image signal) (here, 'N' is a positive integer).

The counter circuit 120 determines whether the previous image signal RGB_P from the frame memory 110 corresponds to a black grayscale. When the previous image signal RGB_P corresponds to the black grayscale, the counter circuit 120 counts up a count value CNT. For example, when the previous image signal RGB_P corresponds to the black grayscale, the counter circuit 120 increases the count value CNT by 1.

In an embodiment, the counter circuit 120 may determine whether the previous image signal RGB_P corresponds to the black grayscale in units of the one pixel PX (see FIG. 3). In an embodiment, the counter circuit 120 may determine whether the previous image signal RGB_P corresponds to the black grayscale in units of block each of which includes a plurality of pixels PX (see FIG. 3). For example, when the predetermined number or more of the previous image signal RGB_P within one block corresponds to the black grayscale, the block may be determined to correspond to the black grayscale.

In an embodiment, the counter circuit 120 may output the number of consecutive frames, in which the previous image signal RGB_P corresponds to the black grayscale, as the count value CNT.

When the previous image signal RGB_P does not include the black grayscale, the counter circuit 120 resets the count value CNT to 0.

The gain calculator 130 outputs a gain GN in response to the count value CNT from the counter circuit 120.

The DCC compensation unit 140 outputs the image data signal DS in response to the input image signal RGB and the gain GN.

Figure 9:
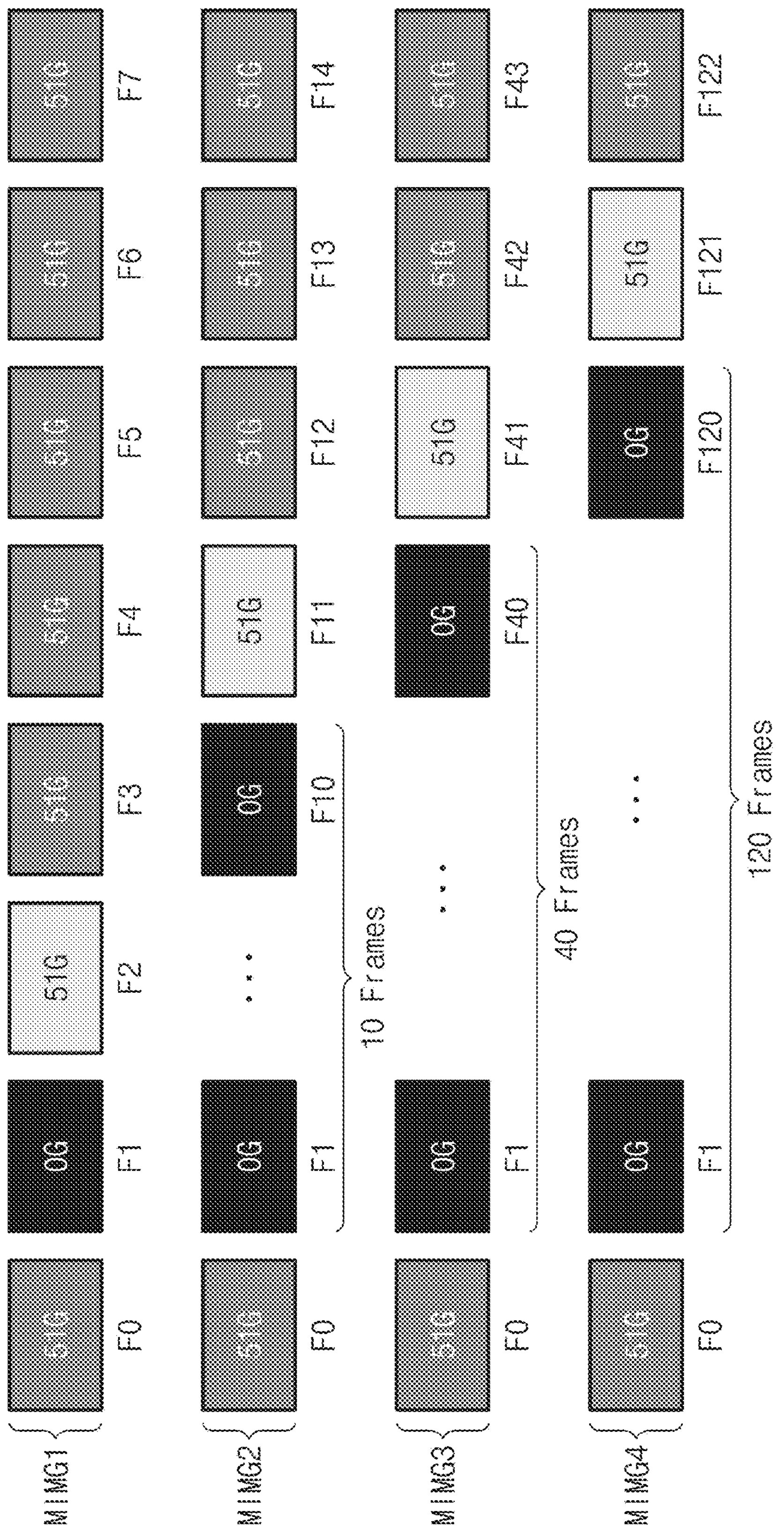
FIG. 9 is a diagram showing images displayed on an electronic device.

FIG. 9 is a diagram showing images displayed on an electronic device.

Referring to FIG. 9, a first image MIMG1 includes a black pattern during a first frame F1 and includes a gray pattern during the remaining frames F0 and F2 to F7. A second image MIMG2 includes a black pattern during the first to $10^{th}$ frames F1 to F10 (i.e., ten frames) and includes a gray pattern during the remaining frames F0 and F11 to F14. A third image MIMG3 includes a black pattern during first to $40^{th}$ frames F1 to F40 (i.e., 40 frames) and includes a gray pattern during the remaining frames F0 and F41 to F43. A fourth image MIMG4 includes a black pattern during first to $120^{th}$ frames F1 to F120 (i.e., 120 frames) and includes a gray pattern during the remaining frames F0, F121, and F122.

For example, in FIG. 9, the black pattern is 0 grayscale 0G, and the gray pattern is 51 grayscale 51G.

Figure 10A:
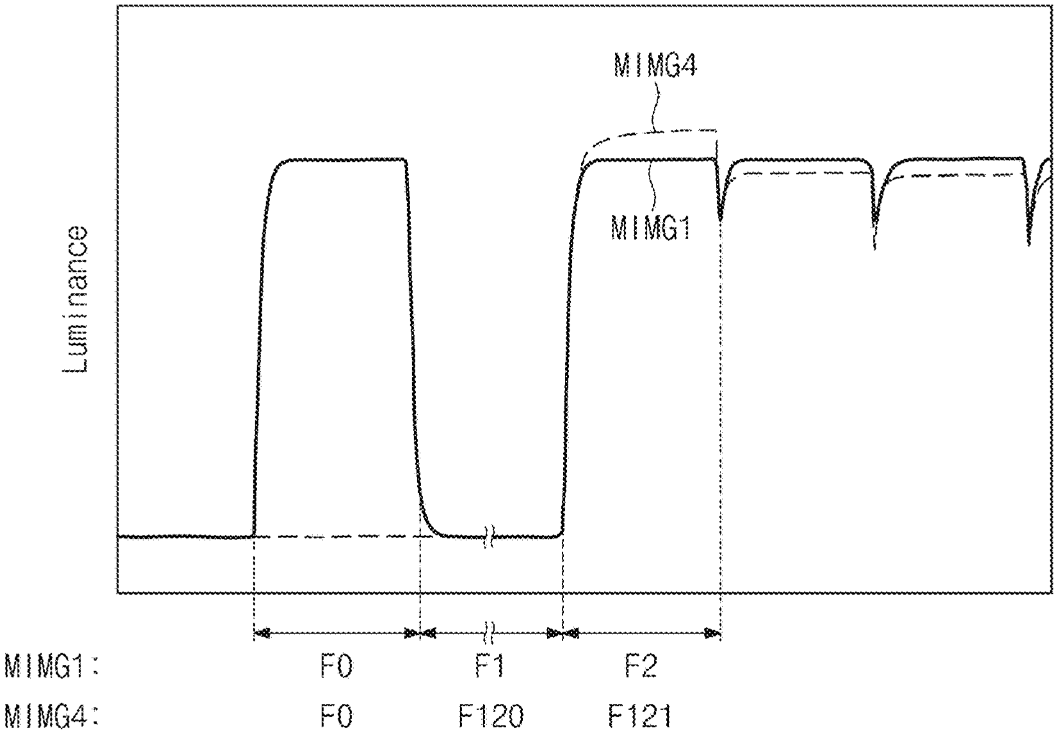
FIGS. 10A, 10B, and 10C are diagrams showing luminance changes when first to fourth images shown in FIG. 9 are displayed on an electronic device.
Figure 10B:
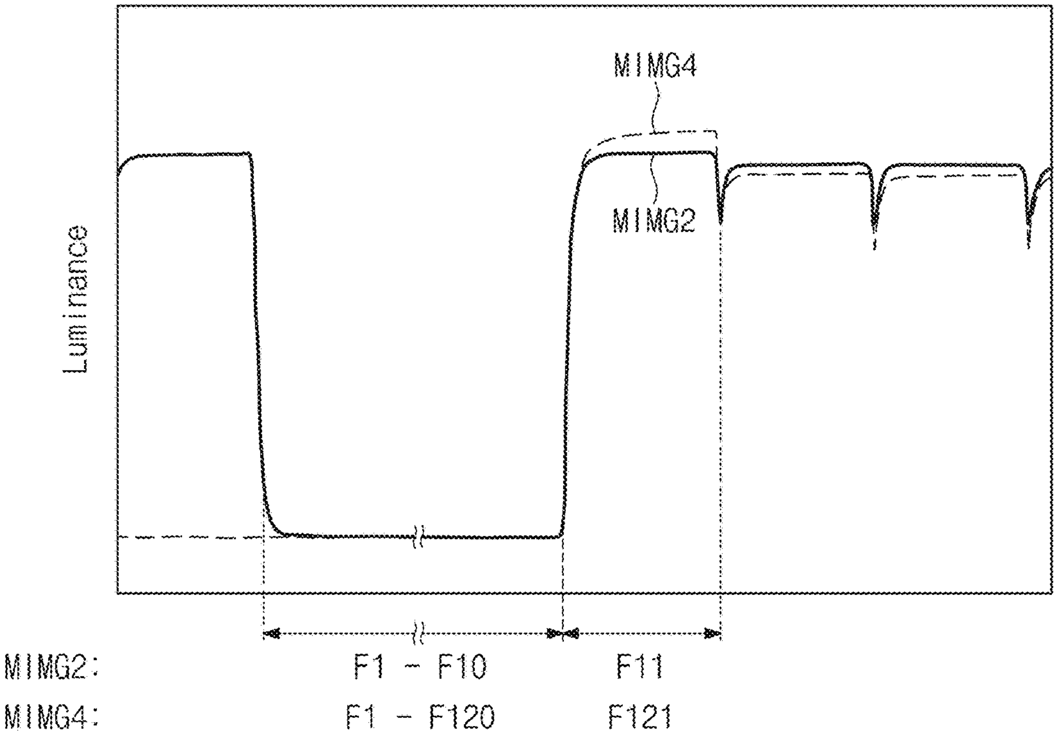
Figure 10C:
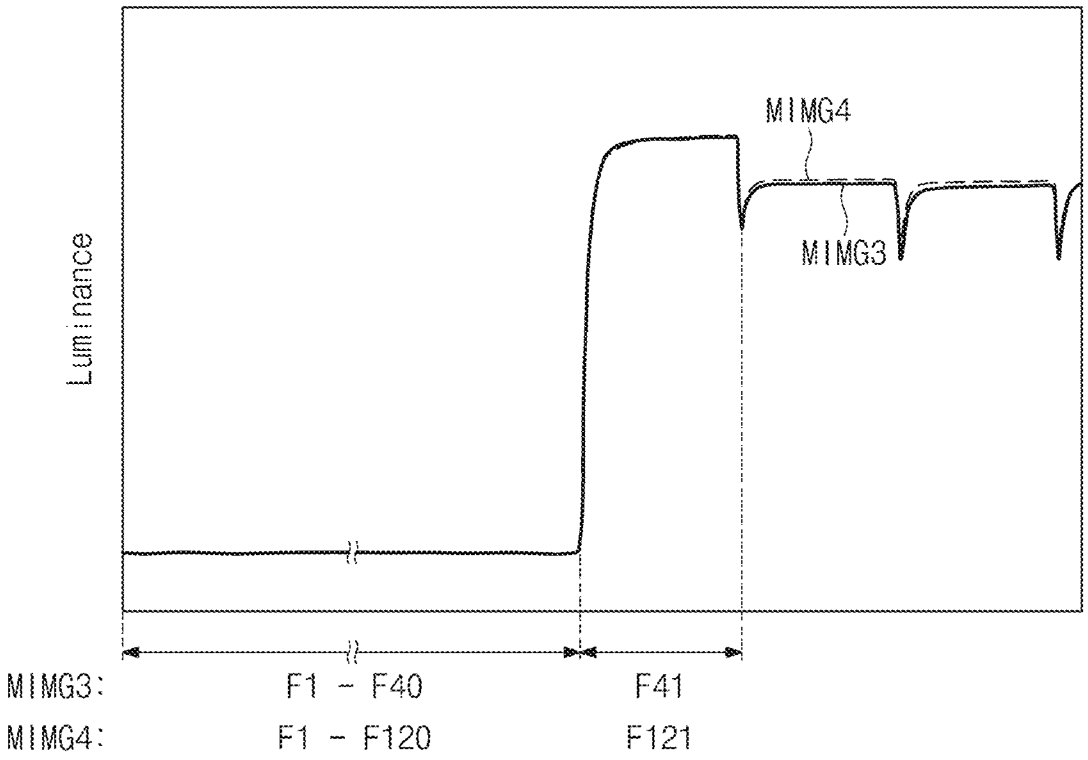

FIGS. 10A, 10B, and 10C are diagrams showing luminance changes when the first to fourth images MIMG1 to MIMG4 shown in FIG. 9 are displayed on an electronic device.

FIG. 10A is a diagram showing a luminance change when the first image MIMG1 and the fourth image MIMG4 shown in FIG. 9 are displayed on an electronic device.

FIG. 10A shows the luminance of each of the $0^{th}$, first and second frames F0, F1, and F2 of the first image MIMG1 and the luminance of each of the $0^{th}$, $120^{th}$, and $121^{st}$ frames F0, F120, and F121 of the fourth image MIMG4.

Referring to FIGS. 9 and 10A, the first image MIMG1 has a gray pattern during the $0^{th}$ frame F0, a black pattern during the first frame F1, and a gray pattern during the second frame F2.

The fourth image MIMG4 has a gray pattern during the $0^{th}$ frame F0, a black pattern during each of the first to $120^{th}$ frames F1 to F120, and a gray pattern during the $121^{st}$ frame F121.

After the black pattern is displayed for a long time, the luminance of the fourth image MIMG4 which displays the gray pattern overshoots to have luminance greater than the luminance of the first image MIMG1.

FIG. 10B is a diagram showing a luminance change when the second image MIMG2 and the fourth image MIMG4 shown in FIG. 9 are displayed on an electronic device.

In FIG. 10B, the luminance of each of the first to tenth frames F1 to F10 of the second image MIMG2 and the luminance of each of the first to $120^{th}$ frames F1 to F120 of the fourth image MIMG4 are shown to be overlapped, and the luminance of the eleventh frame F11 of the second image MIMG2 and the luminance of the $121^{st}$ frame F121 of the fourth image MIMG4 are shown to be overlapped.

Referring to FIGS. 9 and 10B, the second image MIMG2 has a gray pattern during the oth frame F0, a black pattern during the first to tenth frames F1 to F10, and a gray pattern during the eleventh frame F11.

The fourth image MIMG4 has a gray pattern during the $0^{th}$ frame F0, a black pattern during each of the first to $120^{th}$ frames F1 to F120, and a gray pattern during the $121^{st}$ frame F121.

After the black pattern is displayed for a long time, the luminance of the fourth image MIMG4 which displays the gray pattern overshoots to have luminance greater than the luminance of the second image MIMG2.

FIG. 10C is a diagram showing a luminance change when the third image MIMG3 and the fourth image MIMG4 shown in FIG. 9 are displayed on an electronic device.

In FIG. 10C, the luminance of each of the first to $40^{th}$ frames F1 to F40 of the third image MIMG3 and the luminance of each of the first to $120^{th}$ frames F1 to F120 of the fourth image MIMG4 are shown to be overlapped, and the luminance of the $41^{st}$ frame F41 of the third image MIMG3 and the luminance of the $121^{st}$ frame F121 of the fourth image MIMG4 are shown to be overlapped.

Referring to FIGS. 9 and 10C, the third image MIMG3 has a black pattern during the first to $40^{th}$ frames F1 to F40, and a gray pattern during the $41^{st}$ frame F41.

The fourth image MIMG4 has a black pattern during the first to $120^{th}$ frames F1 to F120, and a gray pattern during the $121^{st}$ frame F121.

In the example shown in FIG. 10C, the luminance of the third image MIMG3 and the fourth image MIMG4 are substantially the same as each other.

Returning to FIGS. 8 and 9, the counter circuit 120 may count number of frames in which the black pattern lasts in the previous image signal RGB_P. For example, when the previous image signal RGB_P includes a black grayscale, the counter circuit 120 increases a count value CNT by 1.

When the previous image signal RGB_P corresponds to the first image MIMG1, the count value CNT may increase to 1. When the previous image signal RGB_P corresponds to the second image MIMG2, the count value CNT may increase to 10. When the previous image signal RGB_P corresponds to the third image MIMG3, the count value CNT may increase to 40. When the previous image signal RGB_P corresponds to the fourth image MIMG4, the count value CNT may increase to 120.

Figure 11:
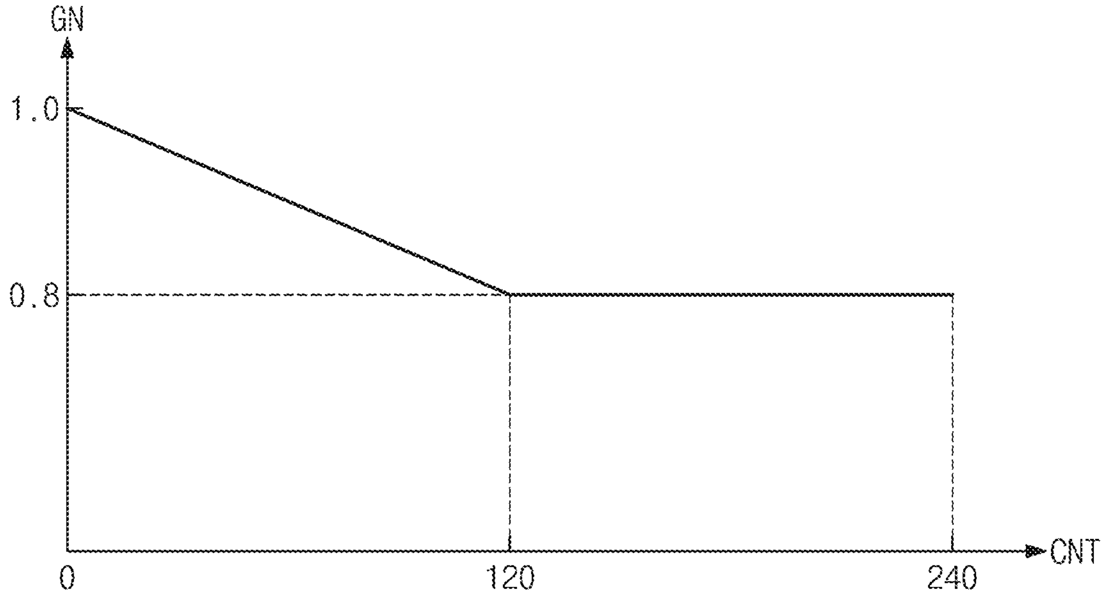
FIG. 11 is a diagram showing a gain according to a count value.

FIG. 11 is a diagram showing the gain GN according to the count value CNT.

Referring to FIGS. 8 and 11, the gain calculator 130 outputs the gain GN corresponding to the count value CNT.

In the example shown in FIG. 8, the gain GN is less than or equal to 1 and greater than or equal to 0.8. In the case where the count value CNT increases when the count value CNT is greater than 0 and less than or equal to 120, the gain GN decreases. That is, when the count value CNT is greater than 0 and less than or equal to 120, the count value CNT and the gain GN are inversely proportional.

As may be seen in FIGS. 10A, 10B and 10C, as the number of frames that displays the black pattern increases, the overshoot level of the luminance becomes greater when the gray pattern is displayed after the black pattern is displayed. However, it may be seen that the overshoot level converges to a constant value when the black pattern lasts for a certain amount of time or more (e.g., 40 frames or more) and then displays to a gray pattern.

Accordingly, when the count value CNT is less than or equal to a reference value (e.g., 120), the gain calculator 130 outputs the gain GN which is inversely proportional to the count value CNT. When the count value CNT is greater than the reference value (e.g., 120), the gain calculator 130 outputs the gain GN of a predetermined value (e.g., 0.8).

The reference value of the count value CNT and the gain GN shown in FIG. 11 are merely examples, and the present disclosure is not limited thereto.

Figure 12A:
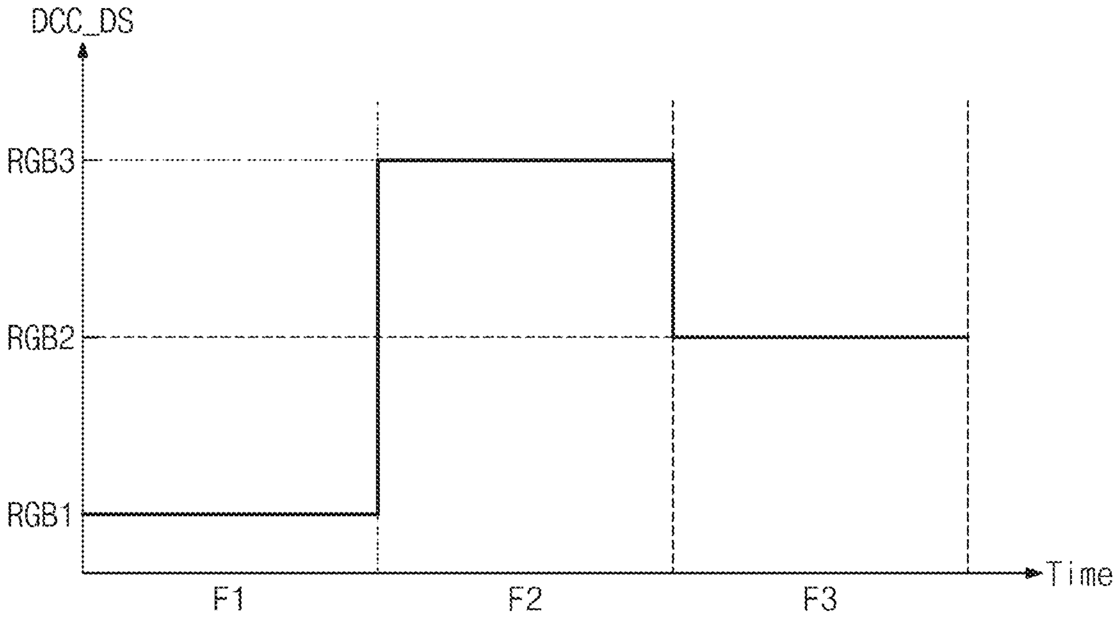
FIGS. 12A and 12B are diagrams for describing an operation of a DCC compensation unit.
Figure 12B:
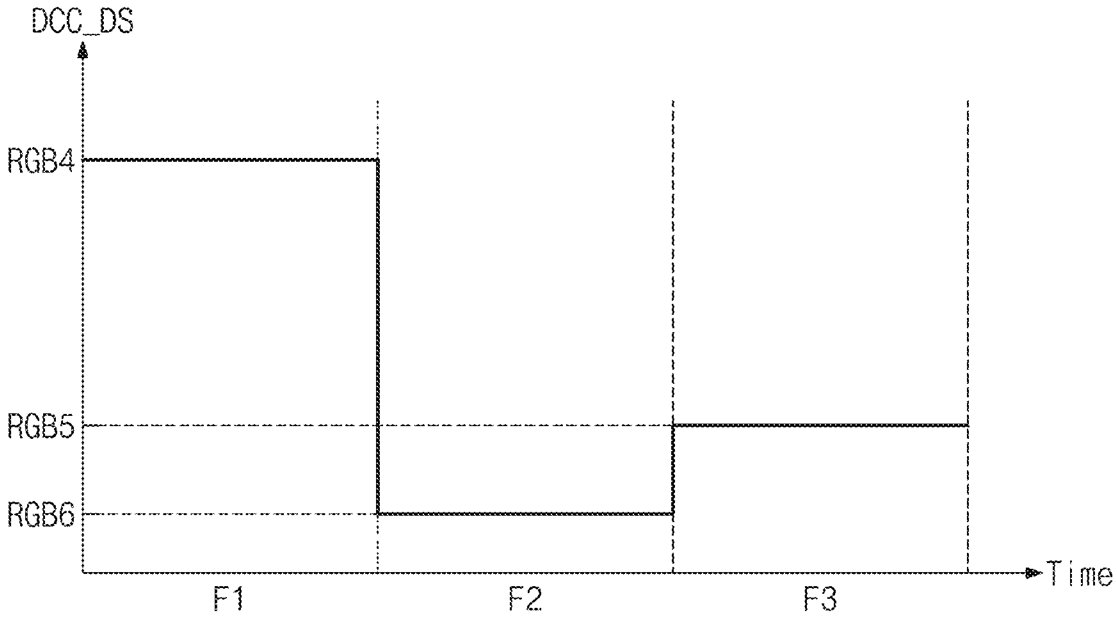

FIGS. 12A and 12B are diagrams for describing an operation of the DCC compensation unit 140.

Referring to FIGS. 8 and 12A, the DCC compensation unit 140 converts the input image signal RGB into a DCC compensation signal DCC_DS depending on the characteristics of the display panel DP (see FIG. 3).

For example, it is assumed that the input image signal RGB corresponds to a first input image signal RGB1 during the first frame F1, and the input image signal RGB corresponds to a second input image signal RGB2 during the second and third frames F2 and F3.

It may be predicted that the display panel DP emits at luminance lower than luminance corresponding to the second input image signal RGB2 when the input image signal RGB changes from the first input image signal RGB1 to the second input image signal RGB2. In this case, the DCC compensation unit 140 performs over-drive that outputs the DCC compensation signal DCC_DS during the second frame F2 as the third input image signal RGB3 greater than the second input image signal RGB2. When the DCC compensation signal DCC_DS corresponding to the third input image signal RGB3 during the second frame F2 is output as the image data signal DS, the luminance of the display panel DP may correspond to the second input image signal RGB2.

Referring to FIGS. 8 and 12B, the DCC compensation unit 140 converts the input image signal RGB into the DCC compensation signal DCC_DS depending on the characteristics of the display panel DP (see FIG. 3).

For example, it is assumed that the input image signal RGB corresponds to a fourth input image signal RGB4 during the first frame F1, and the input image signal RGB corresponds to a fifth input image signal RGB5 during the second and third frames F2 and F3.

It may be predicted that the display panel DP emits at luminance higher than luminance corresponding to the fifth input image signal RGB5 when the input image signal RGB changes from the fourth image signal RGB4 to the fifth input image signal RGB5. In this case, the DCC compensation unit 140 performs under-drive that outputs the DCC compensation signal DCC_DS during the second frame F2 as the sixth input image signal RGB6 smaller than the fifth input image signal RGB5. When the DCC compensation signal DCC_DS corresponding to the sixth input image signal RGB6 during the second frame F2 is output as the image data signal DS, the luminance of the display panel DP may correspond to the fifth input image signal RGB5.

Figures 13, 14:
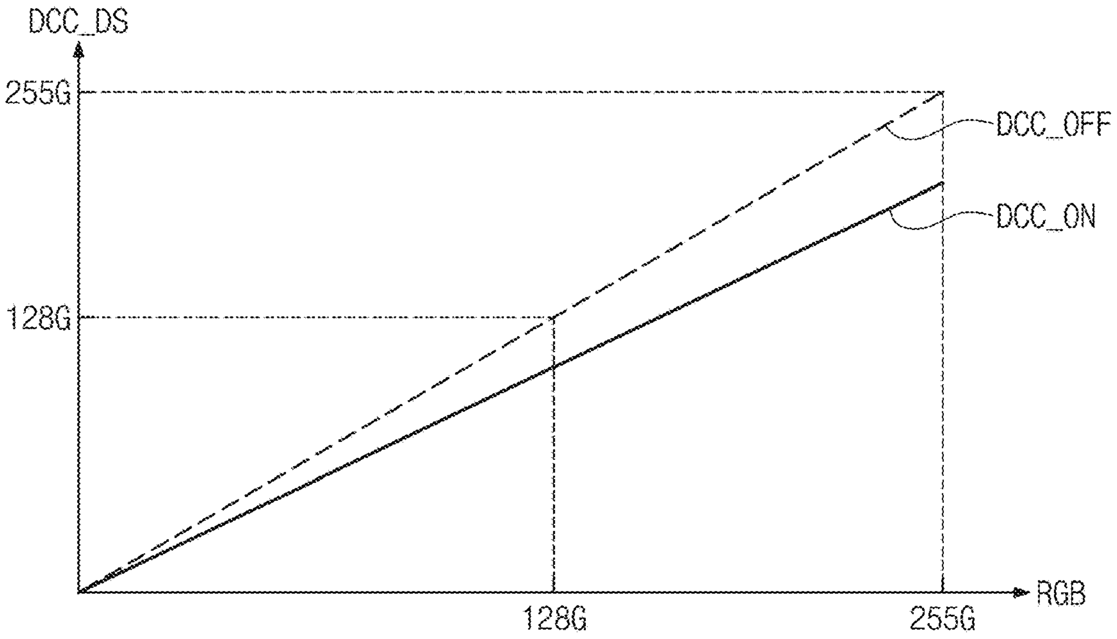
FIG. 13 is a diagram showing a relationship between an input image signal and a DCC compensation signal according to an operating state of a DCC compensation unit.
FIG. 14 is a lookup table showing a relationship between an input image signal and a DCC compensation signal of a DCC compensation unit.

FIG. 13 is a diagram showing a relationship between the input image signal RGB and the DCC compensation signal DCC_DS according to an operating state of the DCC compensation unit 140.

Referring to FIGS. 8 and 13, the DCC compensation unit 140 may selectively perform DCC compensation. That is, the DCC compensation unit 140 may operate in either a DCC compensation on mode or a DCC compensation off mode. In the DCC compensation off mode DCC_OFF, the DCC compensation signal DCC_DS of the DCC compensation unit 140 may be the same as the input image signal RGB. For example, when the input image signal RGB is 128 grayscale 128G, the DCC compensation signal DCC_DS is 128 grayscale 128G. For example, when the input image signal RGB is 255 grayscale 255G, the DCC compensation signal DCC_DS is 255 grayscale 255G.

In the DCC compensation on mode (DCC_ON), the DCC compensation signal DCC_DS of the DCC compensation unit 140 may have a grayscale lower than the input image signal RGB. For example, when the input image signal RGB is 128 grayscale 128G, the DCC compensation signal DCC_DS may have a grayscale 121G lower than 128 grayscale 128G. For example, when the input image signal RGB is 255 grayscale 255G, the DCC compensation signal DCC_DS may have a grayscale 243G lower than 255 grayscale 255G.

FIG. 14 is a lookup table showing a relationship between the input image signal RGB and the DCC compensation signal DCC_DS of the DCC compensation unit 140.

Referring to FIGS. 8 and 14, when the DCC compensation unit 140 is in a DCC compensation on mode, the DCC compensation unit 140 outputs the DCC compensation signal DCC_DS depending on the input image signal RGB of a current frame.

When the grayscale of the input image signal RGB is 0 grayscale OG during a (N-1)-th frame, the DCC compensation signal DCC_DS has 0 grayscale OG the same as the input image signal RGB.

When the grayscale of the input image signal RGB is greater than 0 grayscale 0G, the DCC compensation signal DCC_DS has a lower grayscale than the input image signal RGB.

For example, when the grayscale of the input image signal RGB is 32, 64, 96, 128, 160, 192, 224, and 255 grayscales 32G, 64G, 96G, 128G, 160G, 192G, 224G, and 255G, the DCC compensation signal DCC_DS has 30, 61, 91, 121, 152, 182, 212 and 243 grayscales 30G, 61G, 91G, 121G, 152G, 182G, 212G and 243G, respectively.

Figure 15:
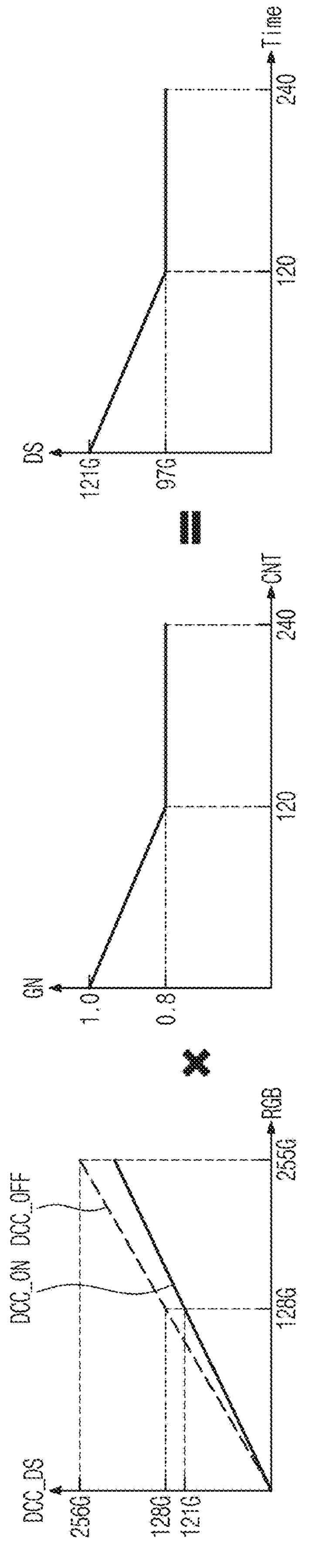
FIG. 15 is a diagram for describing an operation of a DCC compensation unit according to an embodiment of the present disclosure.

FIG. 15 is a diagram for describing an operation of the DCC compensation unit 140 according to an embodiment of the present disclosure.

Referring to FIGS. 8 and 15, when the previous image signal RGB_P from the frame memory 110 is not 0 grayscale (0G), the DCC compensation unit 140 outputs the DCC compensation signal DCC_DS according to the DCC compensation on/off mode as the image data signal DS.

When the grayscale of the previous image signal RGB_P from the frame memory 110 is 0 grayscale (0G), the DCC compensation unit 140 outputs the image data signal DS by multiplying the DCC compensation signal DCC_DS according to the DCC compensation on mode by the gain GN.

In the example shown in FIG. 15, when the previous image signal RGB_P of the previous frame is 0 grayscale 0G, the input image signal RGB of the current frame is 128 grayscale 128G, and the gain GN is 1, the image data signal DS has 121 grayscale 121G.

In another example, when the previous image signal RGB_P of the previous frame is 0 grayscale 0G, the input image signal RGB of the current frame is 128 grayscale 128G, and the gain GN is 0.8, the image data signal DS has 97 grayscale 97G.

In other words, when the previous image signal RGB_P of the previous frame is 0 grayscale 0G, and the input image signal RGB of the current frame is not 0 grayscale 0G, the image data signal DS is outputs based on the DCC compensation signal DCC_DS according to the DCC compensation operation of the input image signal RGB and the gain GN according to the count value CNT.

As a result, when the previous image signal RGB_P of the previous frame is 0 grayscale 0G, and the input image signal RGB of the current frame is not 0 grayscale 0G, under-drive is performed to output the image data signal DS at a grayscale lower than the input image signal RGB. Accordingly, as shown in FIGS. 10A and 10B, it is possible to prevent luminance from being overshot when an image having a different grayscale is displayed after a black pattern is displayed for a long time.

Figure 16A:
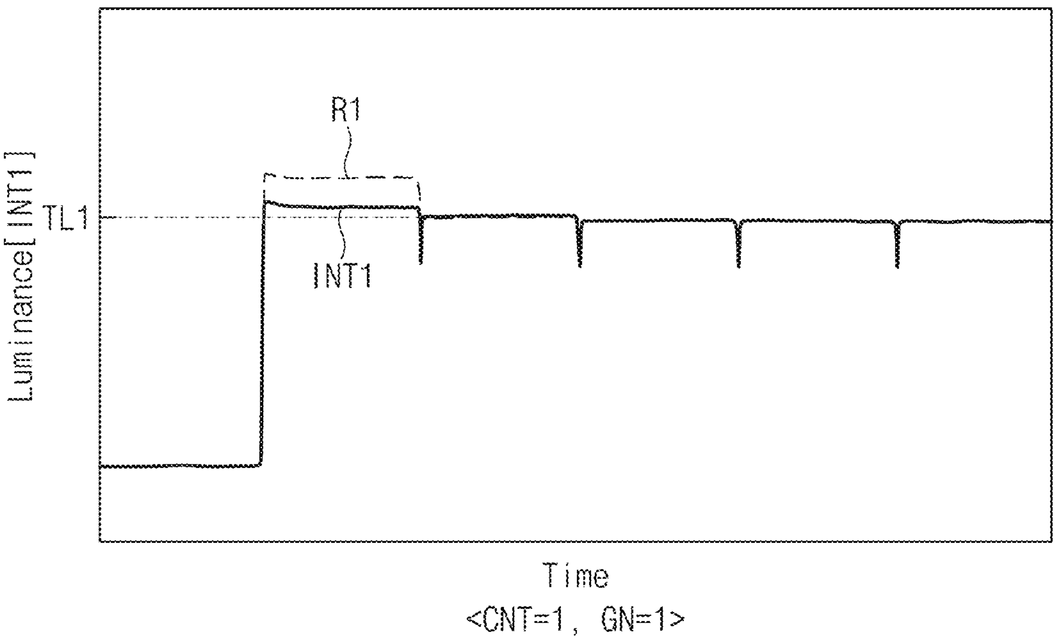
FIGS. 16A, 16B, and 16C are diagrams showing luminance changes according to a gain.
Figure 16B:
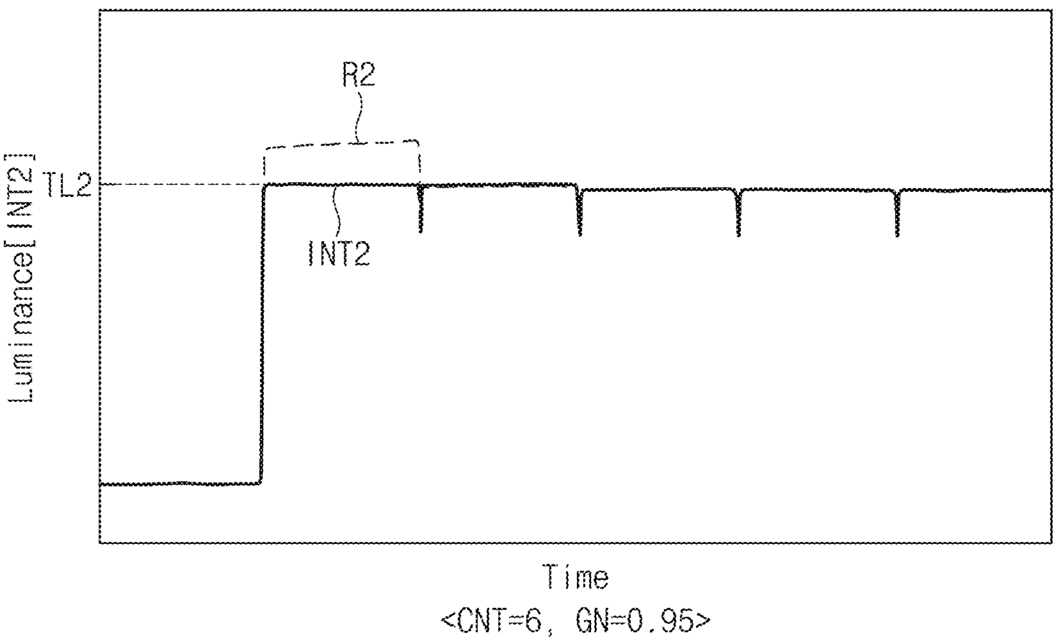
Figure 16C:
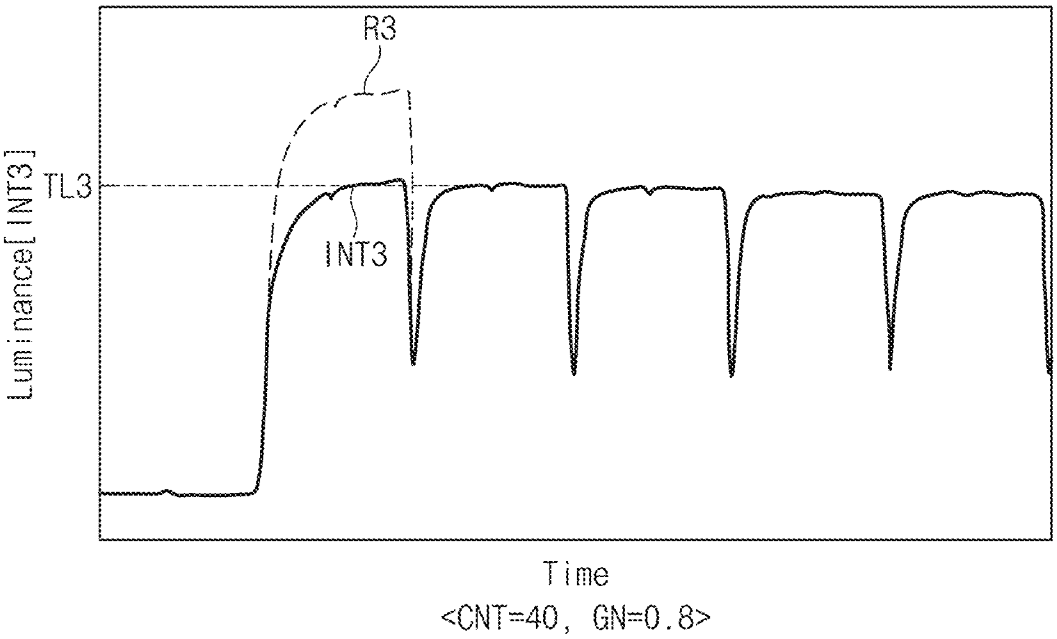

FIGS. 16A, 16B, and 16C are diagrams showing luminance changes according to the gain GN.

References R1, R2, and R3 in FIGS. 16A, 16B, and 16C indicate luminance when the DCC compensation unit 140 does not compensate for the black pattern.

Referring to FIGS. 8 and 16A, when the count value CNT is 1, and the gain GN is 1, luminance INT1 corresponding to the image data signal DS becomes lower than the reference R1 and approaches target luminance TL1 due to the DCC compensation operation of the DCC compensation unit 140.

Referring to FIGS. 8 and 16B, when the count value CNT is 6, and the gain GN is 0.95, luminance INT2 corresponding to the image data signal DS output from the DCC compensation unit 140 becomes lower than the reference R2 and approaches target luminance TL2.

Referring to FIGS. 8 and 16C, when the count value CNT is 40, and the gain GN is 0.8, luminance INT3 corresponding to the image data signal DS output from the DCC compensation unit 140 becomes lower than the reference R3 and approaches target luminance TL3.

In particular, as shown in FIGS. 16B and 16C, as the count value CNT increases, luminance of the reference R2 or R3 overshoots the target luminance TL2 or TL3. However, the luminance INT2 or INT3 corresponding to the image data signal DS may approach the target luminance TL2 or TL3 by reducing the gain GN.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

A driving controller of an electronic device having this configuration may compensate for the luminance of a display image depending on the time during which a black grayscale image is continuously displayed in previous frames. Accordingly, it is possible to prevent the display quality of the image displayed in a current frame from being degraded by the black grayscale image in the previous frames.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A driving controller comprising:

a memory configured to store an input image signal and to output a previous image signal;

a counter circuit configured to count up a count value when the previous image signal corresponds to a black grayscale and to output the count value;

a gain calculator configured to output a gain in response to the count value; and a compensation unit configured to output an image data signal based on the input image signal and the gain when the previous image signal corresponds to the black grayscale.

2. The driving controller of claim 1, wherein the input image signal is an image signal corresponding to a current frame and the previous image signal is an image signal corresponding to a previous frame.

3. The driving controller of claim 2, wherein the counter circuit outputs a number of consecutive frames, in which the previous image signal corresponds to the black grayscale, as the count value.

4. The driving controller of claim 1, wherein the gain calculator outputs the gain having a value inversely proportional to the count value.

5. The driving controller of claim 1, wherein the gain calculator outputs the gain having a value inversely proportional to the count value when the count value is less than or equal to a reference value and outputs the gain having a predetermined value when the count value is greater than the reference value.

6. The driving controller of claim 1, wherein the compensation unit operates in one of a dynamic capacitance compensation (DCC) compensation on mode or a DCC compensation off mode, and wherein, in the DCC compensation on mode, the compensation unit outputs a DCC compensation signal corresponding to the input image signal.

7. The driving controller of claim 6, wherein, when the previous image signal corresponds to the black grayscale in the DCC compensation on mode, the compensation unit outputs a product of the DCC compensation signal and the gain as the image data signal.

8. The driving controller of claim 7, wherein the gain is less than or equal to 1.

9. The driving controller of claim 6, wherein, in the DCC compensation on mode, the compensation unit outputs the DCC compensation signal corresponding to a grayscale lower than a grayscale of the input image signal.

10. The driving controller of claim 6, wherein, in the DCC compensation off mode, the compensation unit outputs the DCC compensation signal identical to the input image signal.

11. An electronic device comprising:

a display panel;

a driving controller configured to receive an input image signal and to output an image data signal; and a data driving circuit configured to provide the display panel with a data signal corresponding to the image data signal, wherein the driving controller includes:

a memory configured to store the input image signal and to output a previous image signal;

a counter circuit configured to count up a count value when the previous image signal corresponds to a black grayscale and to output the count value;

a gain calculator configured to output a gain in response to the count value; and a compensation unit configured to output the image data signal based on the input image signal and the gain when the previous image signal corresponds to the black grayscale.

12. The electronic device of claim 11, wherein the input image signal is an image signal corresponding to a current frame, and the previous image signal is an image signal corresponding to a previous frame.

13. The electronic device of claim 12, wherein the counter circuit outputs a number of consecutive frames, in which the previous image signal corresponds to the black grayscale, as the count value.

14. The electronic device of claim 11, wherein the gain calculator outputs the gain having a value inversely proportional to the count value.

15. The electronic device of claim 11, wherein the gain calculator outputs the gain having a value inversely proportional to the count value when the count value is less than or equal to a reference value and outputs the gain having a predetermined value when the count value is greater than the reference value.

16. The electronic device of claim 11, wherein the compensation unit operates in one of a DCC compensation on mode or a DCC compensation off mode, and wherein, in the DCC compensation on mode, the compensation unit outputs a DCC compensation signal corresponding to the input image signal.

17. The electronic device of claim 16, wherein when the previous image signal corresponds to the black grayscale in the DCC compensation on mode, the compensation unit outputs a product of the DCC compensation signal and the gain as the image data signal.

18. The electronic device of claim 17, wherein the gain is less than or equal to 1.

19. The electronic device of claim 16, wherein, in the DCC compensation on mode, the compensation unit outputs the DCC compensation signal corresponding to a grayscale lower than a grayscale of the input image signal.

20. The electronic device of claim 16, wherein, in the DCC compensation off mode, the compensation unit outputs the DCC compensation signal identical to the input image signal.

* * * * *